US012769971B2

(12) United States Patent
Li

(10) Patent No.: US 12,769,971 B2
(45) Date of Patent: Oct. 20, 2026

(54) CARD WITH TOGGLE ADJUSTING DEVICE

(71) Applicant: He Li, Chengdu (CN)

(72) Inventor: He Li, Chengdu (CN)

( * ) Notice: Subject to any disclaimer, the term of this patent is extended or adjusted under 35 U.S.C. 154(b) by 0 days.

(21) Appl. No.: 18/863,963

(22) PCT Filed: Nov. 16, 2023

(86) PCT No.: PCT/CN2023/132077

§ 371 (c)(1),
(2) Date: Nov. 7, 2024

(87) PCT Pub. No.: WO2024/131399

PCT Pub. Date: Jun. 27, 2024

(65) Prior Publication Data

US 2026/0187401 A1 Jul. 2, 2026

(30) Foreign Application Priority Data

Dec. 19, 2022 (CN) ........................ 202211629739.X

(51) Int. Cl.
*G06K 19/07* (2006.01)

(52) U.S. Cl.
CPC ................................ *G06K 19/0719* (2013.01)

(58) Field of Classification Search
CPC .................................................. G06K 19/0719
USPC .......................................................... 235/492
See application file for complete search history.

(56) References Cited

U.S. PATENT DOCUMENTS 11,104,170 B2 8/2021 Scmitt-Lewen et al.
11,176,541 B1 11/2021 Gupta
11,653,463 B2 5/2023 Pinto et al.
2007/0158412 A1 7/2007 Kang et al.
2022/0147974 A1 * 5/2022 Law ........................ G06F 21/34

FOREIGN PATENT DOCUMENTS

CN 1823338 A 8/2006
CN 100561506 C 11/2009
CN 204706053 U 10/2015
CN 208969700 U 6/2019
CN 110859049 A 3/2020
CN 210155710 U 3/2020
(Continued)

*Primary Examiner* — Toan C Ly
(74) *Attorney, Agent, or Firm* — Maschoff Brennan

(57) ABSTRACT

A card with a toggle adjusting device includes a housing, toggle adjusting component, circuit board, microprocessor, data communication unit, power supply device, adjustable electrical signal device, and data storage. The toggle adjusting component and the adjustable electrical signal device constitute a toggle adjusting assembly, and different position states of multiple groups of toggle adjusting components after toggling are converted into different electric signals. The data communication unit is connected to the microprocessor through the wires on the circuit board to exchange data. The data storage and the microprocessor are connected inside a chip. The power supply device is connected to the microprocessor. The housing includes front and back packaging shells, showing a thin sheet structure. When the card is read, the time for sequentially and repeatedly checking and reading all the toggle adjusting components can be completed within 0.1 second.

13 Claims, 10 Drawing Sheets

(56) References Cited

FOREIGN PATENT DOCUMENTS

| | | | |
|---|---|---|---|
| CN | 112016659 | A | 12/2020 |
| CN | 112819126 | A | 5/2021 |
| CN | 114730366 | A | 7/2022 |
| CN | 217404884 | U | 9/2022 |
| CN | 115759170 | A | 3/2023 |
| CN | 219285743 | U | 6/2023 |
| KR | 10-2007-0109450 | A | 11/2007 |

* cited by examiner

CARD WITH TOGGLE ADJUSTING DEVICE

TECHNICAL FIELD

The present disclosure relates to the field of electronic cards.

BACKGROUND

Currently, commonly used electronic cards include radio frequency (RF) cards, magnetic cards, and IC cards. Compared with magnetic cards, radio frequency cards and IC cards are more secure and used more often. Radio frequency cards include commonly used NFC cards, radio frequency cards and IC cards are generally passive devices, and some are designed to be powered. When using the cards, it is generally password-free payment. If there is a password input requirement, you need to enter the password at the terminal. Some cards with keys need to be provided with a screen to display the entered numbers, such as the patent application for invention with Application No. 202110469907.2 and title of "Active Visual Card Supporting Active and Passive Collection and Payment Functions". The patent application for invention with Application No. 201210395107.1 and title of "NFC (Near Field Communication) Keyboard and Realizing Method Thereof" uses the keyboard for interaction and requires an active scene. At the same time, there is an input process when reading the card, which increases the service time.

According to the patent application for invention with Patent No. CN201310342086 and title of "Method for Controlling NFC Label and Controlled NFC Label", the disconnection control signal or the conduction control signal is applied to an electronic switch connected in parallel with the NFC antenna coil in the NFC tag, thereby enabling or disabling the coupled electromagnetic energy in the NFC antenna coil is transferred to the NFC tag chip in the NFC tag. This makes the reading of the NFC tag chip conditional, thereby avoiding some unnecessary operations and improving the security of the information stored in the NFC tag chip. This method cannot transmit and interact with more setting information.

Commonly used password-free payments may be compromised when the card is lost. Using the on-site password input requires an input terminal, and the transaction time will be delayed due to key input and will be observed and recorded. The method of a card with keys also has limitations on the input time during the transaction process and the need for power supply. In addition, the RF card password-free payment may be compromised from a distance by high-power transmitting device, causing losses or trouble.

SUMMARY

An objective of the present disclosure is to provide a card with a toggle adjusting device that can be used safely and quickly in a variety of usage scenarios and can be used normally under passive power supply conditions.

The present disclosure is implemented as follows:

A card with a toggle adjusting device includes a housing 100, a toggle adjusting component 200, a circuit board 301, a microprocessor 303, a data communication unit, a power supply device, an adjustable electrical signal component 311, and a data storage 308, where the toggle adjusting component 200 and the adjustable electrical signal component 311 constitute a toggle adjusting assembly; the adjustable electrical signal component 311 converts different position states of the corresponding toggle adjusting components 200 after toggling into different electrical signals; the adjustable electrical signal component 311 is connected to the microprocessor 303 through wires on the circuit board 301, and the microprocessor 303 obtains set data; the data communication unit is connected to the microprocessor 303 through the wires on the circuit board 301 to exchange data; the data storage 308 is connected to the microprocessor 303; the power supply device is connected to the microprocessor 303; and the housing 100 is composed of a front packaging shell 101 and a back packaging shell 501, showing a thin sheet structure.

The toggle adjusting component 200 comprises a plurality of toggle adjusting units 201, and the toggle adjusting unit is a toggle dial or a toggle button on a surface of the housing; the adjustable electrical signal component 311 comprises a plurality of adjustable electrical signal elements 306; the data communication unit comprises at least one of NFC, Bluetooth, ISO7816 interface data and RFID, ZigBee and WIFI exchange methods, and wherein the data communication unit is connected to the microprocessor 303 to exchange data externally.

The adjustable electrical signal element 306 is a multi-speed switch or an adjustable resistor or an adjustable capacitor or an adjustable inductor or a magnetic angle sensor.

The toggle adjusting unit 201 is a gear toggle dial, and the adjustable electrical signal element 306 is the multi-speed switch integrated with the circuit board 301; the multi-speed switch comprises a common contact, a contact brush, and a plurality of contacts; the contact brush is a metal spring leaf 203 with an inner ring contact 204 and outer ring contacts 205; the metal spring leaf 203 is embedded into and fixedly connected to a lower surface of the gear toggle dial; a plurality of contacts are outer ring multi-section metal circuits 207 on the circuit board 301, and an inner ring metal circuit 206 is the common contact; the inner and outer ring metal circuits on the circuit board 301 are coaxial with the gear toggle dial and connected to the gear toggle dial through rivets 202; the gear toggle dial and the circuit board are capable of rotating relative to each other; the metal spring leaf 303 conducts one section of the outer ring multi-section metal circuits 207 with the inner ring metal circuit 206; the outer ring multi-section metal circuits 207 correspond to different marks on a scale on an upper surface of the gear toggle dial, respectively; each metal circuit is connected to a voltage dividing resistor R at a different position, and the voltage dividing resistors R are connected to form a linear series circuit; one end of the linear series circuit is connected to a positive electrode of the power supply device, and the other end of the linear series circuit is connected to a negative electrode of the power supply device; each voltage dividing resistor generates a different voltage when the linear series circuit is energized; the inner ring contact 204 is in contact with the inner ring metal circuit 206 and connected to the microprocessor 303; and the microprocessor 303 obtains different voltages of the outer ring multi-section metal circuits 207 through the outer ring contacts 205 according to a rotation position of the toggle adjusting unit 201.

The toggle adjusting unit 201 is a gear toggle dial, and the adjustable electrical signal element 306 is a potentiometer integrated with the circuit board 301; the potentiometer comprises an output end, the contact brush, and a resistor body; the contact brush is a metal spring leaf 203 with an inner ring contact 204 and outer ring contacts 205; the metal spring leaf 203 is embedded into and fixedly connected to the lower surface of the gear toggle dial; the resistor body comprises an outer ring carbon film body 208 with an opening on the circuit board 301; an inner ring metal circle 206 is arranged in the outer ring carbon film body 208; the inner ring metal circle 206 on the circuit board 301 is coaxial with the gear toggle dial and connected to the gear toggle dial through the rivets 202; the gear toggle dial and the circuit board are capable of rotating relative to each other; the metal spring leaf 203 conducts the outer ring carbon film body 208 with the inner ring metal circle 206; different voltages distributed on the outer ring carbon film body 208 correspond to different marks on the scale on the upper surface of the gear toggle dial respectively when energized; one annular end of the opening of the outer ring carbon film body 208 is connected to the positive electrode of the power supply device, and the other end of the opening of the outer ring carbon film body is connected to the negative electrode of the power supply device; the metal spring leaf 203 conducts the different voltages distributed on the outer ring carbon film body 208 to the inner ring metal circle 206; the microprocessor 303 obtains different voltages of the outer ring carbon film body 208 through the metal spring leaf according to a mark on the rotation position of the gear toggle dial; the inner ring metal circle 206 is connected to the microprocessor 303; and the microprocessor performs an AD conversion to obtain a value of the gear toggle dial rotation mark.

The toggle adjusting unit 201 is a gear toggle dial, and the adjustable electrical signal element 306 is a variable capacitor integrated with the circuit board 301; the variable capacitor comprises a stator 221, a rotor 220, and a rotor electrode 223; the stator 221 is located on a metal circuit layer on the back of the circuit board 301 and connected to the microprocessor 303 through an operational amplifier circuit; a periphery of the stator 221 comprises a semicircle and an s-curve; the rotor 220 is a semicircular metal piece embedded into and fixedly connected to a bottom of the gear toggle dial; the rotor 220 and the stator 221 have semicircular homocentric diameters; the rotor electrode 223 is a notched circular metal piece concentric with the gear toggle dial; the rotor electrode 223 covers and presses the gear toggle dial; the rotor electrode is fixedly welded to a front of the circuit board 301 through pins 227 evenly distributed around the rotor electrode 223; the rotor electrode 223 is connected to the negative electrode of the power supply device; a notch of the rotor electrode 223 shows part of the marks of the gear toggle dial and facilitates toggling the gear toggle dial; the gear toggle dial is placed on a front surface of the circuit board 301 to rotate and cooperate with the rotor electrode 223; the bottom of the rotor electrode 223 is conductive with the rotor 220 through the metal contact body 226; as the gear toggle dial rotates, the rotor 220 and the stator 221 and an insulating material of the circuit board 301 spaced between the rotor and the stator forms a capacitor; a projection of the rotor 220 on the circuit board changes from overlapping a semicircle of the stator 221 to forming a complete circle and then overlapping again; and the stator 221 outputs different capacitance value signals to send to the microprocessor 303 after the different capacitance value signals are amplified by the operational amplifier circuit.

The toggle adjusting unit 201 is the toggle button, and the adjustable electrical signal element 306 is the multi-speed switch or a sliding variable resistor integrated with the circuit board 301; the toggle button slides and cooperates with a sliding groove 216 on the circuit board 301; the metal spring leaf 215 with a first and second contacts is connected to the toggle button through screws; the first contact of the metal spring leaf 215 is in contact with a long strip metal line 210 on the upper surface of the circuit board 301; the long strip metal line 210 is connected to the microprocessor 303; the second contact of the metal spring leaf 215 is connected to the long strip multi-section metal lines 211 on the upper surface of the circuit board 301, respectively; or the second contact of the metal spring leaf 215 is in contact with the long strip carbon film body 212 on the upper surface of the circuit board 301; the long strip multi-section metal lines 211 form a linear series resistance circuit with the resistor R, respectively; one end of the circuit is connected to the positive electrode of the power supply device, and the other end of the circuit is connected to the negative electrode of the power supply device; the one end of the long strip carbon film body 212 is connected to the positive electrode of the power supply device, and the other end of the long strip carbon film body 212 is connected to the negative electrode of the power supply device; the different distributed voltages produced by the long strip carbon film body 212 when energized correspond to the marks next to the sliding groove 216; and the microprocessor 303 obtains a corresponding voltage on the long strip carbon film body 212 from the long strip metal line 210 through the metal spring leaf 215 according to the toggle button and a position of the mark.

The toggle adjusting assembly is connected to the microprocessor through a wire connection or a socket connection, and wherein the socket connection enables the toggle adjusting assembly to be placed separately when not in use.

The power supply device supplies power by at least one of a wireless energy collection module and a power supply; the wireless energy collection module is capable of generating a current to the supply power when it is close to the wireless transmitting device; the power supply device has no power when the toggle adjusting assembly is configured to set the data; when the card is used, the card is close to the wireless transmitting device, and the power supply device generates electricity by induction; at this time, the settings of the toggle adjusting assembly are converted into electrical signals to input into the microprocessor; and the power supply device is connected to the microprocessor through a wire connection or a socket connection.

Further comprising a wired communication interface 302, the wired communication interface 302 being connected to the microprocessor 303, wherein the wired communication interface 302 is configured to connect to an external device for communication and power sharing.

Further comprising a display module, the display module being connected to the microprocessor 303 and the housing 100 having a display window corresponding to the display module, wherein the display module is configured to display settings and usage information.

Further comprising an LED light 307, the LED light being connected to the microprocessor 303, wherein the LED light 307 is configured to display working status and information indication.

The marks of the toggle adjusting component 200 are numbers or Braille 240.

The display module comprises a display screen and an electronic component other than the microprocessor that supports the driving of the display screen, and wherein the display screen is an e-paper display 401.

The beneficial effects of the present disclosure are as follows:

According to the card with a toggle adjusting device provided by the present disclosure, it is possible to realize the setting adjustment and make the input complete quickly during use through the toggle adjusting assembly connected to the microprocessor; it is possible to realize multiple ways of data interaction through a digital signal exchange unit connected to the microprocessor; it is possible to supply power to the card with the toggle adjusting device through a power supply unit connected to the microprocessor, where the wireless energy collection module can realize the card to work in a passive mode, and the power supply mode can realize the card to read and write other passive cards in an active mode; it is possible to record information for multiple uses and perform different data interactions according to the settings of the toggle adjusting assembly through the data storage connected to the microprocessor, thus achieving multi-functional requirements; it is convenient for users to view usage information through the display module connected to the microprocessor, where the display module uses an e-paper display as the display screen to enable the content to be continuously displayed in a passive mode; it is possible to display whether the work is normal and the status of the information obtained through the LED light connected to the microprocessor; it can be used normally by the visually impaired and the visually blind through the toggle adjusting unit engraved with Braille; it is possible to realize the display and sound broadcast of the card usage by other devices through a communication socket connected to the microprocessor; and it greatly improves the convenience of carrying by encapsulating the microprocessor, the toggle adjusting assembly, the digital signal exchange unit, the power supply unit and the data storage inside the housing which has a card structure. Compared with the method of relying on a mobile phone or vehicle carrying device to use, the card with the toggle adjusting device greatly reduce the cost of payment products and improve the convenience of use. Compared with traditional card use methods, the card with the toggle adjusting device meets the requirements for diversity of use and also achieves the security of use.

The card with keys has more input options and more input content. However, the input process in the embodiment is mostly sequential input, and the process can only be entered when there is a power supply. To ensure that there is a power supply, the card needs to bring battery itself or can only be input when it is close to a power supply device such as a card reader. Since the size and thickness of the card carried cannot be too large, the keys need to be arranged at a certain distance to facilitate hand operation. As a result, too many keys cannot be arranged on the card. Compared with the card with keys, the card with the toggle adjusting device provided by the present disclosure uses the mode of toggle adjustment to arrange the toggle units in sequence according to the input setting content. Each toggle unit contains multiple choices. Although it eventually becomes a digital signal input, the toggle mode is reflected in the toggle assembly in sequence of setting content and order. Each setting content is displayed on the toggle unit in a compact and orderly manner. It is easy to operate and only uses a single finger to rotate or slide the component, and no load-bearing surface is required to provide pressing reaction force. During adjustment, the content of the adjustment components is observed and understood. Although the number of toggle units and the selectable toggle content of each unit are limited due to the card size requirements, they are sufficient for use. The Card with a toggle adjusting device can be toggled to change settings at any time in a passive mode. After toggling, it can be blocked to prevent observation and recording during use. When in use, the card is close to a power supply device such as a card reader and then toggle the microprocessor, and the settings are read one by one in sequence. Due to the fast AD conversion speed of the microprocessor, the MSP430G2755 used in the embodiment can reach 200,000 AD conversions per second. The time for sequentially and repeatedly checking and reading all the toggle units can be completed within 0.1 second. The usage process is the same as that of ordinary cards, which is fast and convenient. Compared with ordinary cards, this card has more integrated functions and permission security to prevent identity theft on the card. The passive use of the present disclosure decreases the cost, reduces the trouble of charging, increases the overall service life without replacing the battery, and avoids storage restrictions due to the use of batteries.

The card with a toggle adjusting device can be used in meal cards, access control, identity recognition, bank cards, digital currency, and other occasions. When the card with a toggle adjusting device is used as a bank card, the adjustable setting function is query, the adjustment password is the specified password, and the query content can be quickly displayed when the card is placed in the ATM radio frequency read-write area. There is no input process in the entire use process, which is faster and the password will not be leaked due to input actions. Even if the adjusted password on the card is secretly photographed, since the password is the result of conversion through settings and is not the real password, it will not be leaked.

Various functions can be completed through settings. After adjusting the manual settings, the card is close to the card reading device to generate an induced current. The card with a toggle adjusting device uses the induced current to work. According to the settings, the relevant functions are called to read and write parts of the non-contact area and interact with the nearby sensing device to complete the functions.

The card with a toggle adjusting device provided by the present disclosure uses multiple methods to ensure transaction security. First of all, it will be judged whether the adjusted settings allow transactions. If the user sets the card in a closing mode, other settings of the card, password and amount will not be withdrawn, and the transaction will not be carried out. At this time, if the user sets the card in a payment mode, the password set by the card will ensure transaction security. When certain functions are involved in this use, such as the payment function, it will be compared with the last stored settings. If the amount is the same, it will not be executed, avoiding the repeated use and possible identity theft on the card caused by forgetting to modify the set transaction mode or transaction password after using the card.

It can become an information card when used in specific ways. When the card with a toggle adjusting device is close to the card reader, the stored information will be written to the location specified by the contactless chip according to the setting method to complete the functions of different cards.

The card with a toggle adjusting device provided by the present disclosure, with the transaction mode, login password, and transaction amount being toggle settings, can be logged in and used without password when connected to a computer. The security certificate is stored in the card data storage. When transmitting encrypted information, the computer does not need to install a security certificate, and it is faster to use. The integrated design of toggle adjustment makes the card easy to carry.

In order to make the above-mentioned objectives, features, and advantages of the present application more obvious and understandable, preferred embodiments are given below and described in detail with reference to the accompanying drawings.

Figure 1:
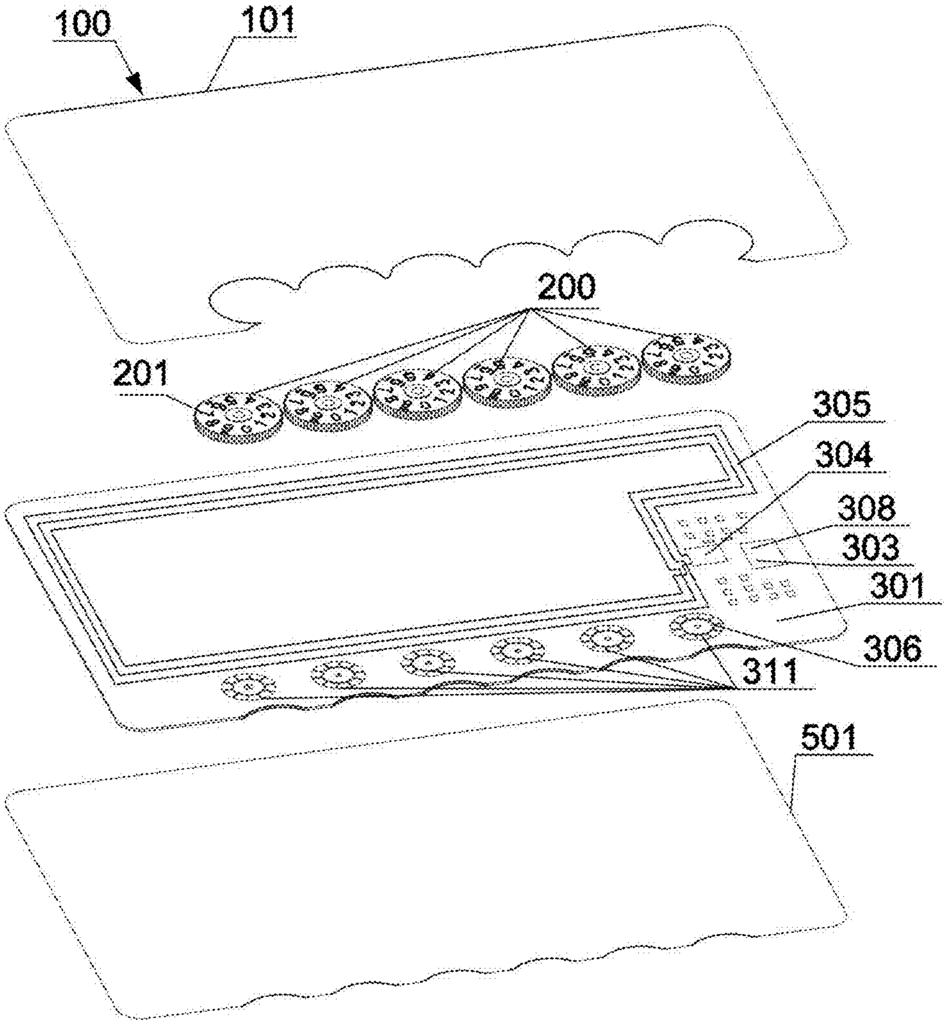
FIG. 1 is an exploded view of a rotary toggle dial according to an Embodiment 1 of the present disclosure.
Figure 2:
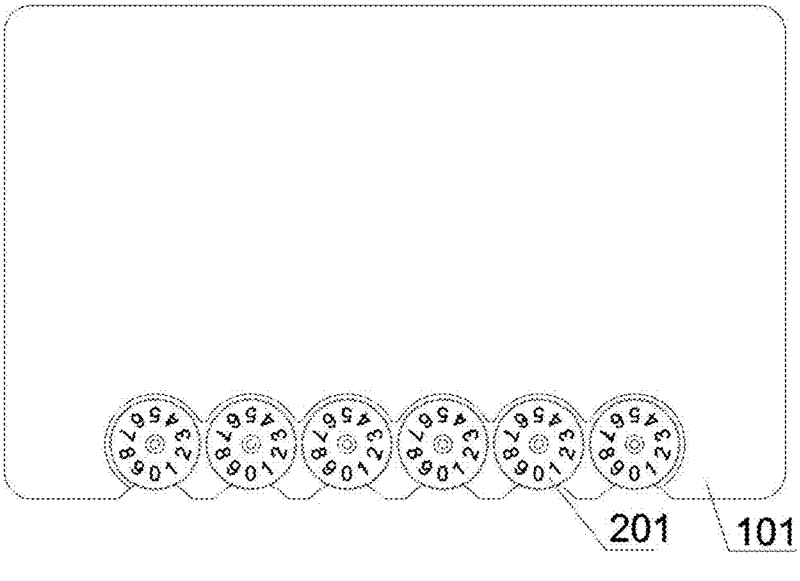
FIG. 2 is a front appearance view of a large card according to Embodiments 1 and 2 of the present disclosure.

Reference numerals: housing 100; front packaging shell 101; toggle adjusting component 200; toggle adjusting unit 201; rivet 202; metal spring leaf 203; inner ring contact 204; outer ring contact 205; inner ring metal line 206; outer ring multi-section metal lines 207; outer ring carbon film body 208; long strip metal line 210; long strip multi-section metal lines 211; long strip carbon film body 212; toggle dial block 213; screw 214; metal spring leaf 215; sliding groove 216; rotor 220; stator 221; solder pad on circuit board 222; rotor electrode 223; limiting projection point 224; limiting recess point 225; metal contact body 226; rotor electrode welding pin on circuit board 227; rotor electrode fixing pin 228; rotor electrode fixing hole on circuit board 229; toggle dial center round hole 230; Braille 240; circuit board 301; wired communication interface 302; microprocessor 303; NFC device 304; NFC antenna 305; adjustable electrical signal element 306; LED light 307; data storage 308; Bluetooth antenna 309; energy storage device 310; adjustable electrical signal component 311; e-paper display 401; back packaging shell 501; back display window 502; back LED light window 503; contact card reader 600; financial card 700; financial card with communication socket 701; active card with toggle adjusting device 800; card with toggle adjusting device 900; USB pinout 901

DETAILED DESCRIPTION

Embodiment 1

A card with a toggle adjusting device includes a housing 100, a toggle adjusting component 200, a circuit board 301, a microprocessor 303, a data communication unit, a power supply device, an adjustable electrical signal component 311, and a data storage 308.

The toggle adjusting component 200 and the adjustable electrical signal component 311 constitute a toggle adjusting assembly; the electrical signal component converts different position states of the corresponding toggle adjusting components after toggling into different electrical signals; the adjustable electrical signal component is connected to the microprocessor through wires on the circuit board, and the microprocessor obtains set data.

A data communication unit is connected to the microprocessor through the wires on the circuit board to exchange data.

The data storage is connected to the microprocessor.

The power supply device is connected to the microprocessor.

The housing 100 is composed of a front packaging shell 101 and a back packaging shell 501, showing a thin sheet structure.

As shown in FIG. 1 to FIG. 4, FIG. 5, FIG. 7, FIG. 8, FIG. 15 to FIG. 21, includes a housing 100, a toggle adjusting component 200, a circuit board 301, a microprocessor 303, a data communication unit, a power supply device, an adjustable electrical signal component 311, and a data storage 308, where the toggle adjusting component 200 and the adjustable electrical signal component 311 constitute a toggle adjusting assembly; the adjustable electrical signal component 311 converts different position states of the corresponding toggle adjusting components 200 after toggling into different electrical signals; the adjustable electrical signal component 311 is connected to the microprocessor 303 through wires on the circuit board 301, and the microprocessor 303 obtains set data; the data communication unit is connected to the microprocessor 303 through the wires on the circuit board 301 to exchange data; the data storage 308 is connected to the microprocessor 303; the power supply device is connected to the microprocessor 303; and the housing 100 is composed of a front packaging shell 101 and a back packaging shell 501, showing a thin sheet structure.

The toggle adjusting component 200 includes a plurality of toggle adjusting units 201, and the toggle adjusting unit 201 is a toggle dial or a toggle button on a surface of the housing. The adjustable electrical signal component 311 includes a plurality of adjustable electrical signal elements 306. The data communication unit includes an NFC device 304 and an NFC antenna 305. The data communication unit is connected to the microprocessor 303 to exchange data externally.

The adjustable electrical signal element 306 is a multi-speed switch.

The toggle adjusting unit 201 is a gear toggle dial, and the adjustable electrical signal element 306 is the multi-speed switch integrated with the circuit board 301. The multi-speed switch includes a common contact, a contact brush, and a plurality of contacts. The contact brush is a metal spring leaf 203 with an inner ring contact 204 and outer ring contacts 205. The metal spring leaf 203 is embedded into and fixedly connected to a lower surface of the gear toggle dial. A plurality of contacts are outer ring multi-section metal circuits 207 on the circuit board 301, and an inner ring metal circuit 206 is the common contact. The inner and outer ring metal circuits on the circuit board 301 are coaxial with the gear toggle dial and connected to the gear toggle dial through rivets 202. The gear toggle dial and the circuit board are capable of rotating relative to each other. The metal spring leaf 303 conducts one section of the outer ring multi-section metal circuits 207 with the inner ring metal circuit 206. The outer ring multi-section metal circuits 207 correspond to different marks on a scale on an upper surface of the gear toggle dial, respectively. Each metal circuit is connected to a voltage dividing resistor R at a different position, and the voltage dividing resistors R are connected to form a linear series circuit. One end of the linear series circuit is connected to a positive electrode of the power supply device, and the other end of the linear series circuit is connected to a negative electrode of the power supply device. Each voltage dividing resistor generates a different voltage when the linear series circuit is energized. The inner ring contact 204 is in contact with the inner ring metal circuit 206 and connected to the microprocessor 303. The microprocessor 303 obtains different voltages of the outer ring multi-section metal circuits 207 through the outer ring contacts 205 according to a rotation position of the toggle adjusting unit 201.

The toggle adjusting assembly is connected to the microprocessor through a wire connection or a socket connection, and the socket connection enables the toggle adjusting assembly to be placed separately when not in use.

The power supply device supplies power by at least one of wireless energy collection module and power supply. The wireless energy collection module is capable of generating a current to a supply power when it is close to the wireless transmitting device. The power supply device has no power when the toggle adjusting assembly is configured to set the data. When the card is used, the card is close to the wireless transmitting device, and the power supply device generates electricity by induction. At this time, the settings of the toggle adjusting assembly are converted into electrical signals to input into the microprocessor. The power supply device is connected to the microprocessor through a wire connection or a socket connection.

The wired communication interface 302 is included, and the wired communication interface 302 is connected to the microprocessor 303 and is configured to connect to an external device for communication and power sharing.

The display module is further included, the display module is connected to the microprocessor 303 and is configured to display settings and usage information, and the housing 100 has a display window corresponding to the display module.

The LED light 307 is included, and the LED light 307 is connected to the microprocessor 303 and is configured to display working status and information indication.

The marks of the toggle adjusting component 200 are numbers or Braille 240.

The display module includes a display screen and an electronic component other than the microprocessor that supports the driving of the display screen, where the display screen is an e-paper display 401.

Figure 3:
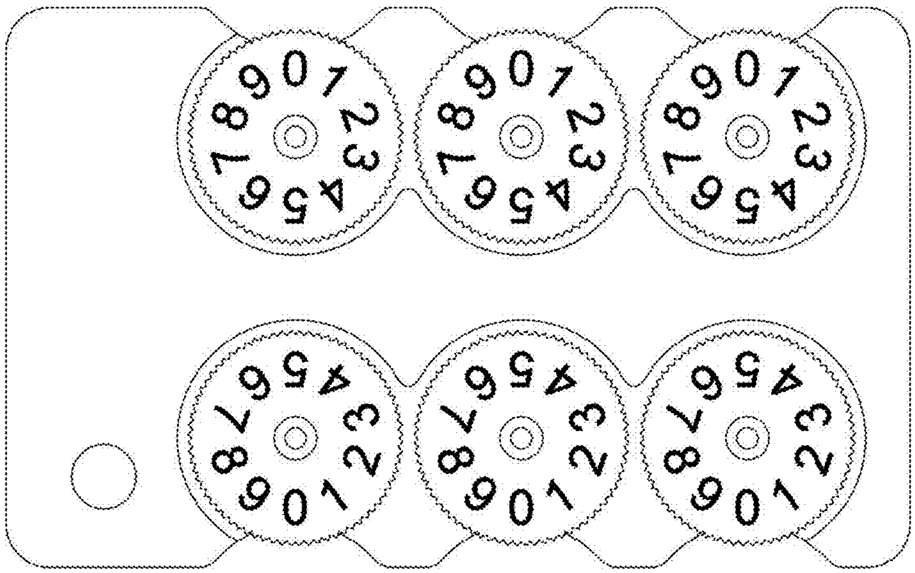
FIG. 3 is a front appearance view of a small card according to Embodiments 1 and 2 of the present disclosure.
Figure 4:
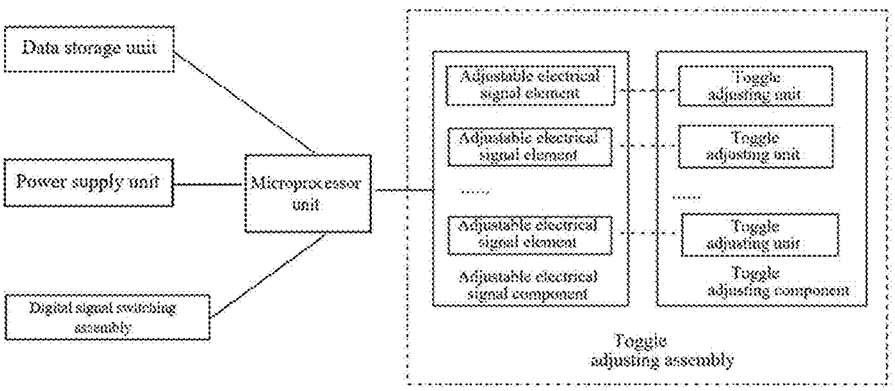
FIG. 4 is a schematic diagram of a circuit connection according to Embodiments of the present disclosure.
Figure 5:
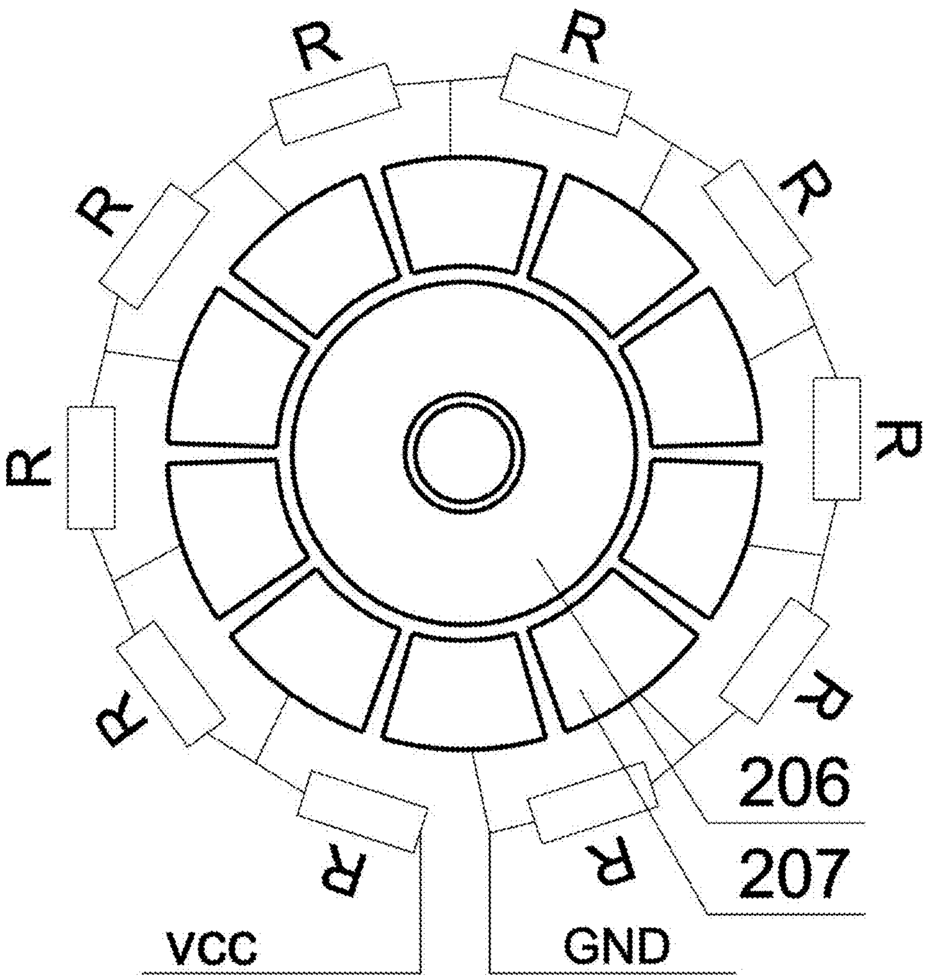
FIG. 5 is a schematic design view of an integrated adjustable electrical signal element and multi-speed switch according to the Embodiment 1 of the present disclosure.
Figure 6:
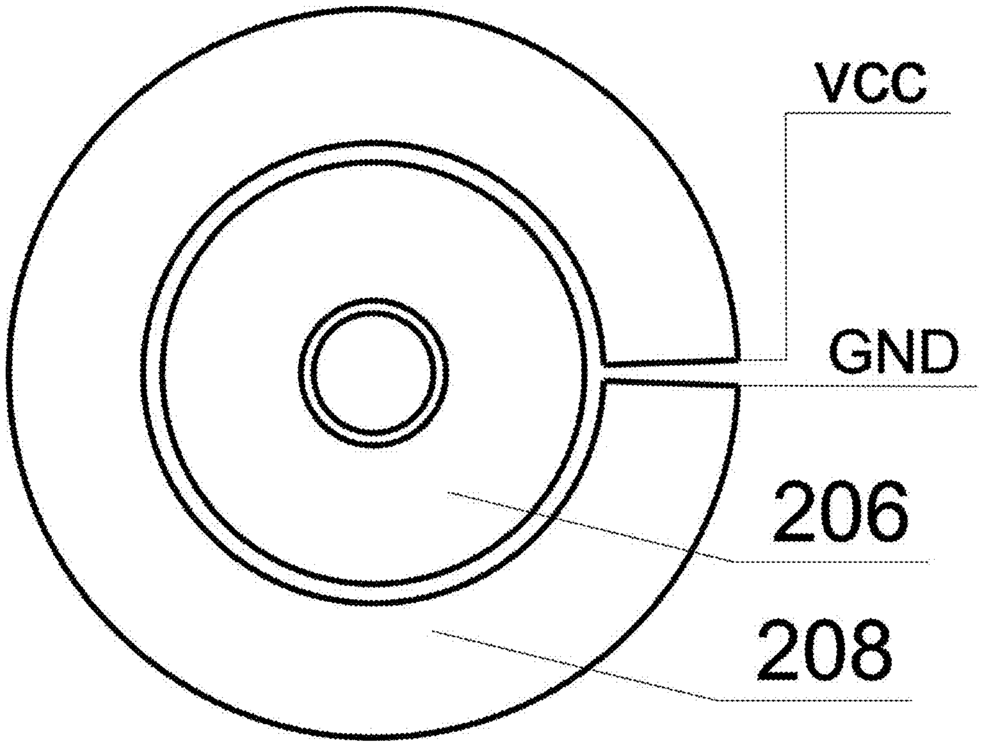
FIG. 6 is a schematic design view of the integrated adjustable electrical signal element and adjustable resistor according to the Embodiment 2 of the present disclosure.
Figure 7:
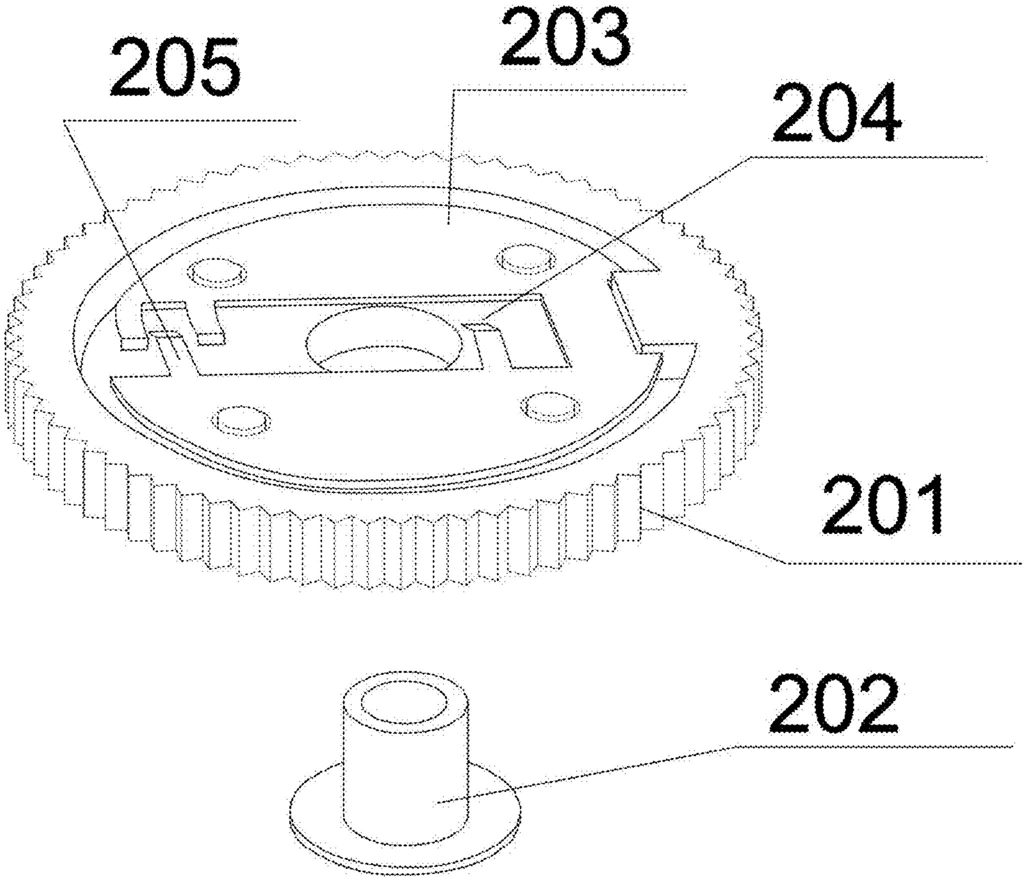
FIG. 7 is a structural diagram of a rotary toggle dial assembly according to the Embodiments 1 and 2 of the present disclosure.
Figure 8:
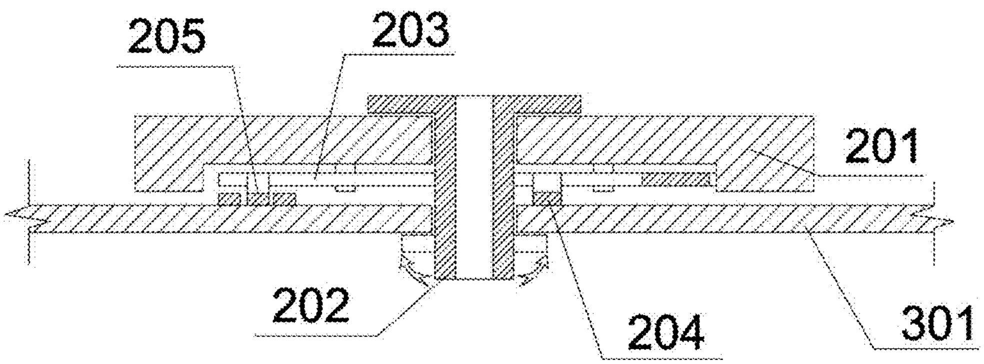
FIG. 8 is a cross-sectional view of the integrated rotary toggle dial assembly and circuit board according to the Embodiments 1 and 2 of the present disclosure.
Figure 9:
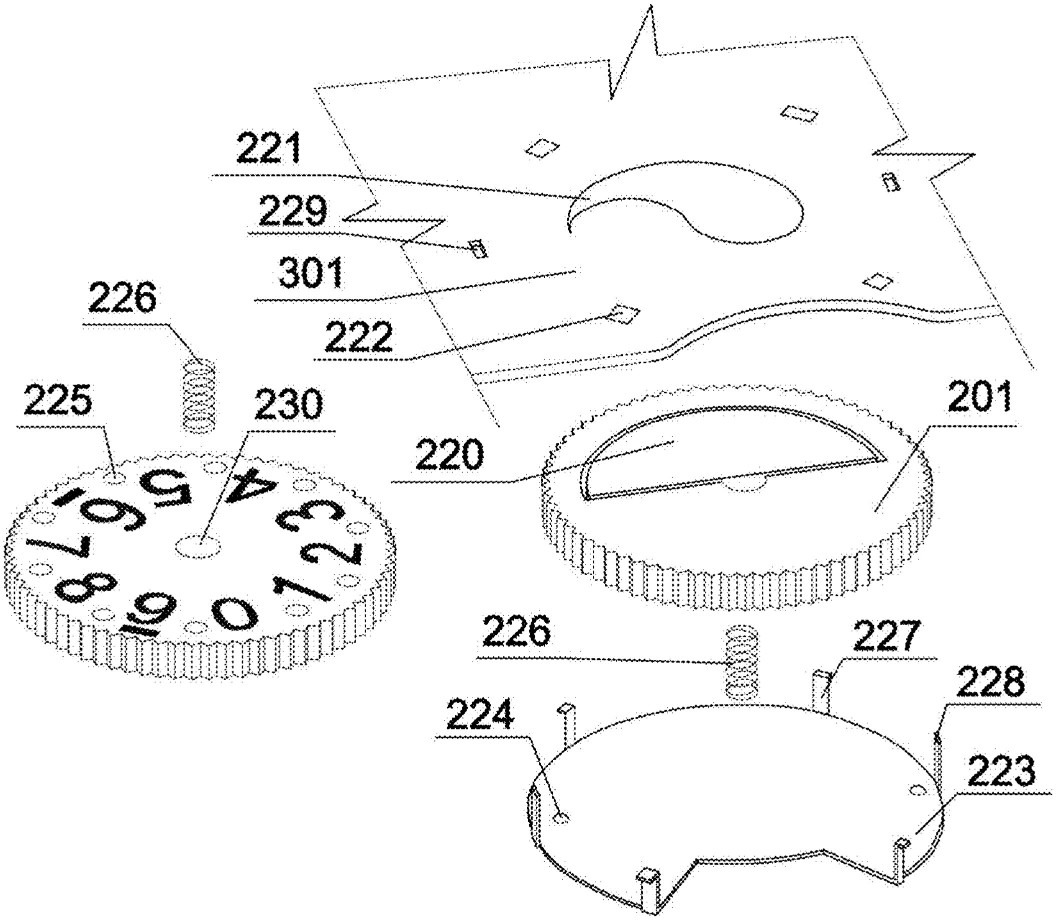
FIG. 9 is a structural design view of the integrated adjustable electrical signal element and adjustable capacitor according to an Embodiment 3 of the present disclosure.
Figure 10:
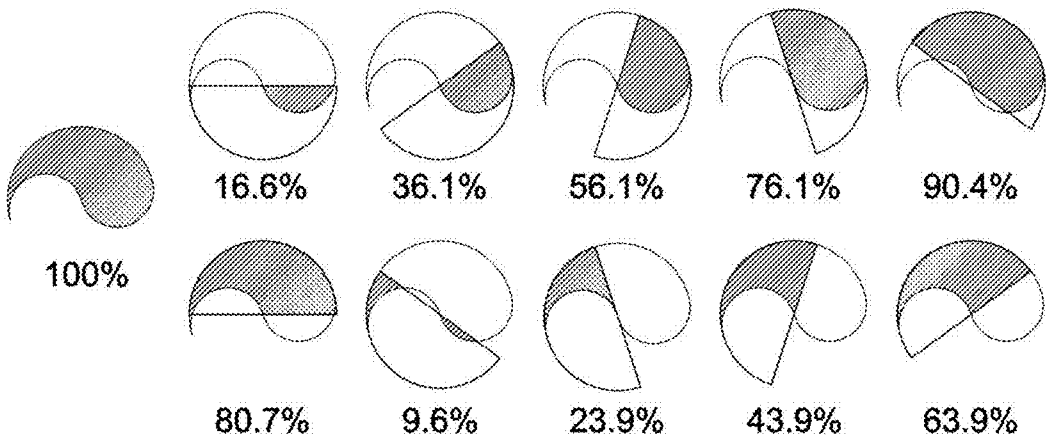
FIG. 10 is a diagram showing an adjustment relationship between a rotor and a stator of an adjustable capacitor in the Embodiment 3 of the present disclosure.
Figure 11:
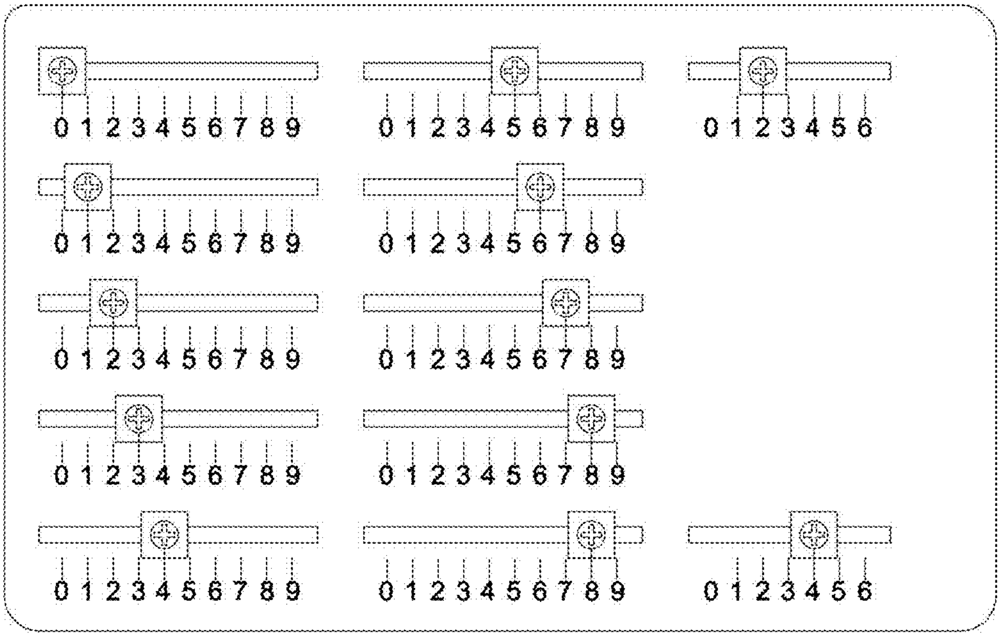
FIG. 11 is a front appearance view showing the toggle adjusting component is a linear toggle button member according to Embodiment 4 of the present disclosure.
Figure 12:
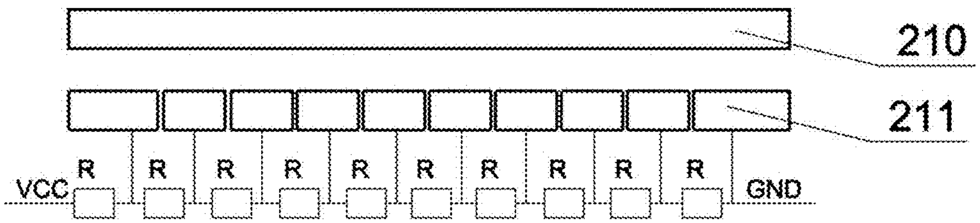
FIG. 12 is a schematic integrated design view showing a toggle-button type adjustable electrical signal element is a multi-speed switch according to an Embodiment 4 of the present disclosure.
Figure 13:
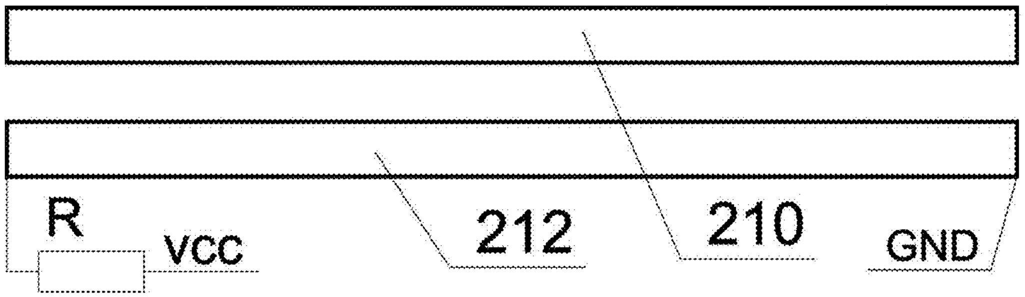
FIG. 13 is a schematic integrated design view showing the toggle-button type adjustable electrical signal element is the adjustable resistor according to the Embodiment 4 of the present disclosure.
Figure 14:
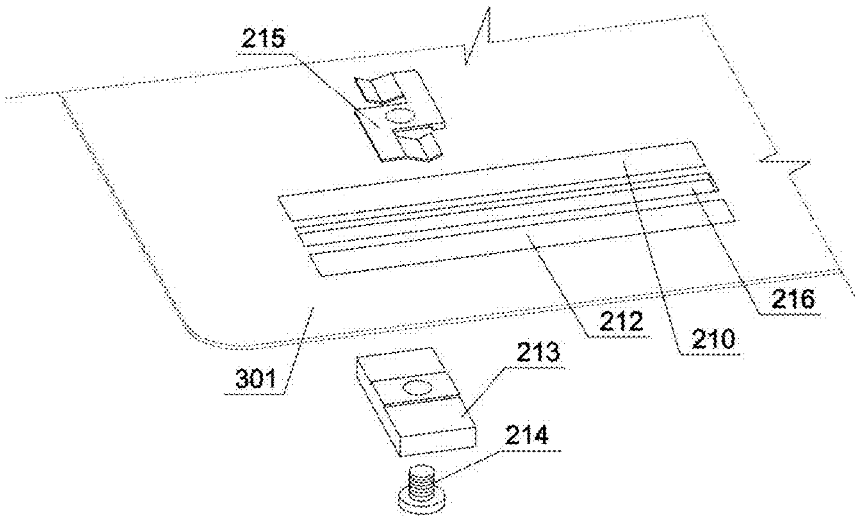
FIG. 14 is a structural integrated design view showing the toggle and the adjustable electrical signal element are adjustable resistors according to the Embodiment 4 of the present disclosure.

FIGS. 1-4 show the wireless energy collection module power supply, NFC communication, no display module, no wired communication interface, and no LED light mode according to this embodiment. FIG. 3 shows a small card form, which is easy to carry due to the small size.

Figure 15:
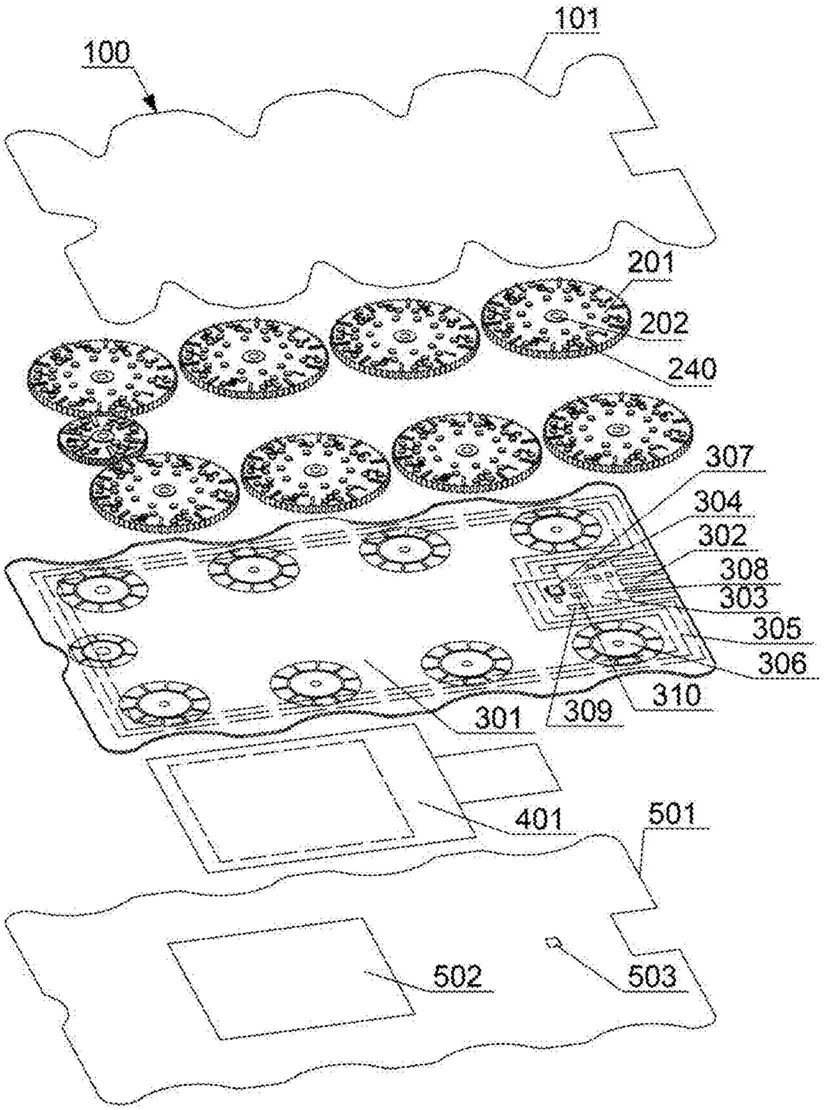
FIG. 15 is an exploded view of a rotary toggle dial member including a display module according to the Embodiments 1 and 2 of the present disclosure.
Figure 16:
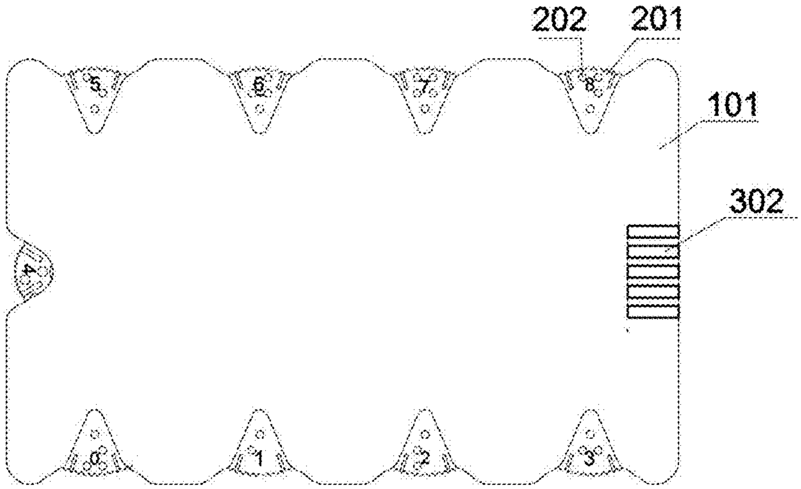
FIG. 16 is one of the front appearance views of the Embodiments 1 and 2 of the present disclosure.
Figure 17:
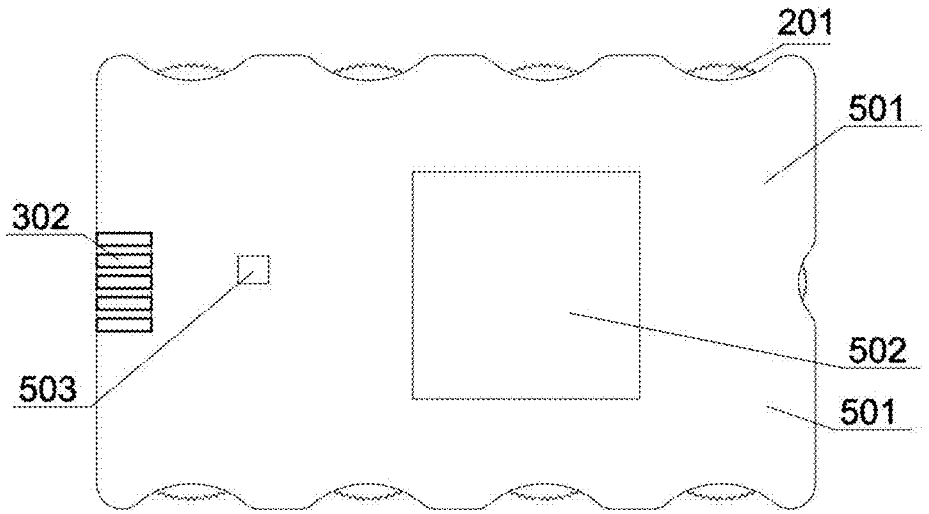
FIG. 17 is a rear appearance view of the Embodiments 1 and 2 of the present disclosure.

FIGS. 15-17 show the wireless energy collection module power supply, NFC and Bluetooth communication, display module, wired communication interface, LED light, and Braille mode according to this embodiment.

Figure 19:
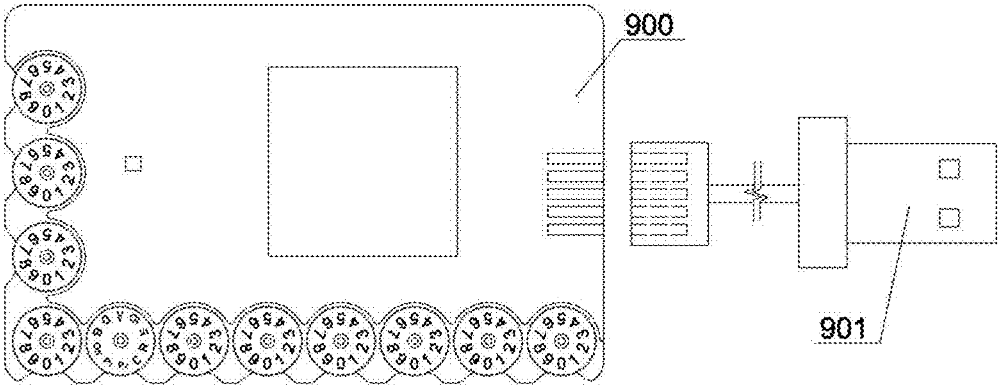
FIG. 19 is another front appearance view of the Embodiments 1 and 2 of the present disclosure.
Figure 21:
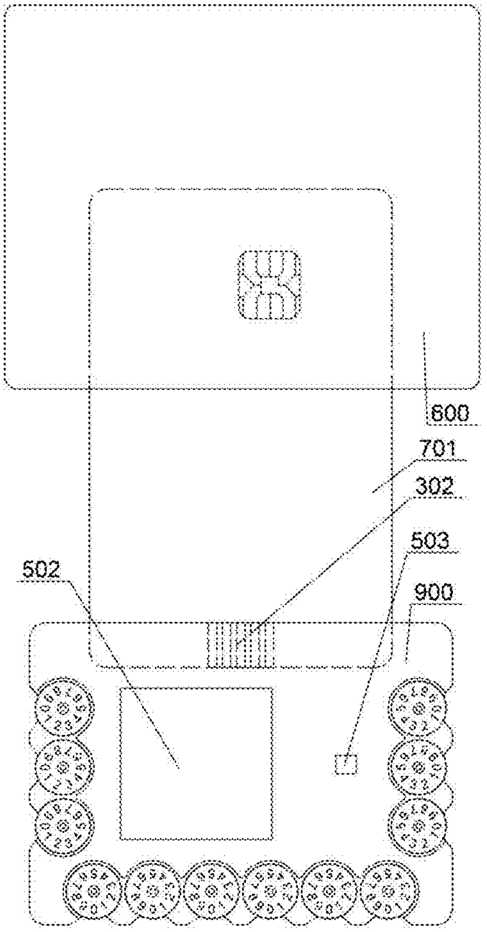
FIG. 21 is another schematic diagram of the contact type use of financial cards according to the Embodiments 1 and 2 of the present disclosure.

FIGS. 19 and 21 show the wireless energy collection module power supply, NFC and Bluetooth communication, display module, wired communication interface, and LED light mode according to this embodiment.

Figure 20:
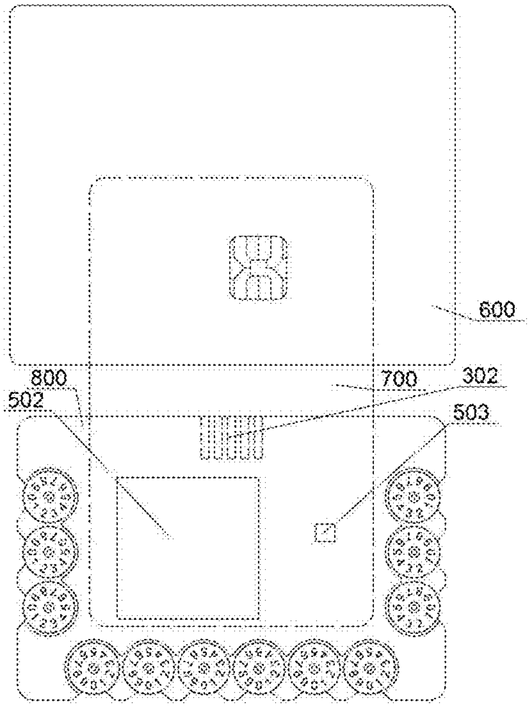
FIG. 20 is one of the schematic diagrams of the contact type use of financial cards according to the Embodiments 1 and 2 of the present disclosure.

FIG. 20 shows the power supply, NFC and Bluetooth communication, display module, wired communication interface, and LED light mode according to this embodiment.

According to the card with a toggle adjusting device in this embodiment, the power supply uses the wireless energy collection module power supply mode. When used, it is close to the radio frequency card reader. The NFC device 304 and the NFC antenna 305 transmit data and generate an induced current to provide to the microprocessor 303 for work. The microprocessor collects the electrical signal value of the toggle adjusting assembly to make a judgment and then exchange data with the card reader. Corresponding to the non-password judgment of the card reader terminal, such as meal cards, access control cards, bus cards, etc. When the corresponding number set by the toggle adjusting assembly is the same as the setting stored in the data storage 308, the microprocessor makes a judgment and sends an instruction to the NFC device 304 for correct data interaction, and no data interaction when they are different, ensuring the safety of the card and preventing losses caused by identity theft on the card. Because the setting of the toggle adjusting assembly only determines the identity of the card itself, and there is no need to modify the software of the card reader, the original ordinary cards can also coexist and be used, and can be gradually updated and replaced. Corresponding to the password judgment of the card reader terminal, such as bank cards, social security cards, etc., the toggle adjusting assembly sets the corresponding number to perform digital conversion and encryption processing through the microprocessor to send to the data receiving end through the NFC device and NFC antenna. The card reader receives more setting information, including passwords, than ordinary cards, and there is no need to use keystrokes for password verification and judgment. This ensures the safety of the card and reduces the time during the process of using, which is more convenient. The software of the card reader needs to be added setting analysis without other changes, and this card can coexist and be used with the original ordinary cards.

According to the wireless energy collection module power supply mode used in this embodiment, the microprocessor uses a low-power chip with multi-channel AD conversions and a built-in storage chip. MSP430G2755 or STC8H1K08 is used according to different needs. The NFC device uses FM11NT082C, has a wireless energy collection function, can provide system power supply, and has encryption verification.

In this embodiment, the card with a toggle adjusting device communicates with a computer without an NFC host function. The wired communication interface 302 can also be used to plug into the conversion socket derived from the USB to implement power supply and communication. The card with a toggle adjusting device is used as a USBKey. Compared to other USBKey, the card with the toggle adjusting device can be used to set passwords, amounts and multi-function switches. The microprocessor 303 outputs the content of toggle settings according to the digital certificate encrypted in the data storage 308 to transmit directly to the remote terminal through the computer. The remote terminal encrypts the feedback data and then directly transmits it to the card with a toggle adjusting device through the computer. The card with a toggle adjusting device decrypts the digital certificate to obtain feedback data. After use, in the case of no power supply, the settings can be adjusted by manual toggle, ensuring the security of identity recognition. The entire process reduces the computer password login verification process and prevents resident keylogging software from stealing information. At the same time, there is no need to install a digital certificate on the computer side, which avoids the compatibility problems caused by the installation of the digital certificate. The card with a display module has display functions, making the use process more intuitive and convenient.

According to the wireless energy collection module power supply mode used by the power supply device and the NFC and Bluetooth modes used by the data communication unit in this embodiment, the card with a toggle adjusting device is close to the device with the NFC host function, radio frequency energy is collected for power supply, and Bluetooth communication is used to connect to the computer, mobile phones and other devices. Since the Bluetooth communication speed is significantly higher than the NFC communication speed to implement remote and fast data interaction, the display module can quickly update the display content. For devices without the NFC host function, the USB lead conversion socket plug-in card wired communication interface mode is used to implement power supply and communication. Compared with the USBKey, the card with the toggle adjusting device can be used to set passwords, amounts and multi-function switches, without having to go to the device for manual data input, improving the security and reducing the password login verification process. The transaction content of toggle settings is output after encrypted by the security certificate in the data storage, without installing another certificate on the device side. In conjunction with the display prompts of the display module, the process of using the card is intuitive, fast and more convenient to operate.

According to the NFC and Bluetooth modes used by the data communication unit in this embodiment, the microprocessor uses a low-power chip with multi-channel AD conversions and a built-in storage chip CH582M. The NFC device uses FM11NT082C, has a wireless energy collection function, can provide system power supply, and has encryption verification.

According to the power supply modes used for NFC communication in this embodiment, the NFC device uses a PN532 chip to control the switching power supply through toggle adjusting settings. When the corresponding toggle adjusting unit adjusts the voltage to 0, the controlled MOS tube is turned off. When the card is not in use, there is a power outage to save battery consumption. When the corresponding toggle adjusting unit adjusts the voltage to be greater than 0, the controlled MOS tube turns on the working power supply. When the corresponding toggle adjusting unit adjusts the voltage to be greater than 0 but lower than a certain value, it is in a passive mode, the card is in a simulation card state, and the gear can be used as a simulation card selection for multiple functions. When the corresponding toggle adjusting unit adjusts the voltage to be greater than 0 and higher than a certain value, it is in an active mode, the card is in a card reader status, and the gear can be used as a card reader mode selection for multiple functions.

According to this embodiment, the toggle adjusting assembly can be toggled to achieve multi-functional requirements. The specific implementation process is as follows: The toggle adjusting assembly sets the corresponding numbers and select the corresponding function. After this card is placed on the card reader to generate the induced current, the microprocessor reads the corresponding content of the data storage according to the settings and performs corresponding data interaction. Different settings read different addresses, have different contents, and have different generated data interactions, achieving multipurpose use. Different contents are preset through the card reader and user permissions through the host computer software. It can realize the coexistence of multiple meal cards, access control cards, bus cards, identification cards, and financial cards on one card, and can also superimpose more data information, such as health codes, product codes, etc. The card can be used as a digital wallet to carry digital currency. When using the card, the toggle settings are used for the password and transaction amount to prevent identity theft on the card and multiple swiping. This card is safe and reliable to carry and use.

As shown in FIG. 19, the second left row on the bottom row of the toggle adjusting assembly is a function setting adjusting dial. When adjusted to “Off”, the toggle adjusting unit is set low and connected to power ground, the NMOS tube is controlled to close, the control end of the connected PMOS tube is pulled up to set high, and the power supply is controlled to be turned off. Even if it is close to the card reader power supply unit to generate the current, the microprocessor of this card is still powered off to prevent having identity theft on the card by remote radio frequency equipment. When adjusted to “P1”, it is the digital wallet payment function. The 4 dials on the left of the function setting adjustment dials are the amount, with a maximum of RMB 999.9, which meets general small-amount payments. The first two of the 6 adjustment dials on the right are the digital currency for payment, up to 100 types of currencies to be selected. The last four are digital wallet passwords, and they can only be used when the passwords are consistent. When the passwords are inconsistent and there are 5 different sets of passwords in use, the digital wallet payment function of the card is locked and needs to be authenticated to unlock. Another “P2” function of the function setting adjustment dial is the same. When the next payment is the same as the previous one, in order to prevent continuous repeated payments, the card needs to be adjusted to another "P2" function to determine whether the payment is different. When adjusted to "C", it is the digital wallet balance checking function. Because this card has many functions and the display screen is small, all contents cannot be displayed at the same time. When it is necessary to obtain the historical transactions, balances, limits and other information of the digital wallet, this function can be used. When adjusted to "R", it is the digital wallet collection function and completes the digital currency withdrawal and collection functions. This card is a passive card and requires an active device to supply power during transactions. The power supply includes wireless power supply and active power supply through the communication socket. The active equipment includes Automatic Telling Machines (ATM), mobile phones, credit card machines, etc. When adjusted to "B", the card is a bank card. The 6 adjustment dials on the right are transaction passwords, the 3 adjustment dials on the upper left select the bank type, and different certificates are called according to the selected bank type. The 1 adjustment dial on the lower left is the new transaction allowed judgment code. In order to prevent the possibility of theft caused by not changing the transaction password dialed by the card after use, it is necessary to determine whether the new transaction allowed judgment code has been manually dialed. If it is inconsistent with the last time, it is determined to be a new transaction. This function is used for withdrawals and inquiries at ATMs, and bank card swipe payments. When adjusted to "D", the card is a bank card. The 6 adjustment dials on the right are transaction passwords, the 3 adjustment dials on the upper left select the bank type, and the 1 adjustment dial on the lower left is the new transaction allowed judgment code. This function is used for making deposits at ATMs. When adjusted to "E", the card is an access control card. The 6 adjustment dials on the right are the access passwords, and the 4 adjustment dials on the left are different access control options. When the card is swiped, the corresponding access control information will be displayed, such as community names, warehouse names, and car names, and these contents can be entered and modified through mobile phone software or card readers, which is easy to use. When adjusted to "ID", the card is an identification card. The 6 adjustment dials on the right are the access passwords, and the 4 dials on the left are identification options, including health codes, electronic passports, electronic driving licenses, and membership cards. The card sends the user's basic information and identity data link location to the authentication device. When adjusted to "A", the card is of other types, including meal cards and bus cards.

When in use, the card is placed in an opaque non-magnetic card holder to cover the toggle adjusting setting information and protect the information from observation. When the interactive data transfers the toggle adjusting setting as a password, the passwords are not stored in the card, which will not cause the risk of password leakage. The card uses a host computer or mobile phone to limit the permission of usage, providing more security, such as password transformation. If the real password is 666666, the dial change numbers are set to 012345, and when the dial is set to 654321, the real password is transmitted as 666666.

There are limits on the single transaction amount, the total transaction amount, and the daily transaction amount. For non-password terminal systems, the limit amount and dial setting numbers are given. No data content is transmitted when the transaction amount exceeds the limit. For the password terminal system, the card simultaneously transmits the transmission password and the limit mode corresponding to the conversion of various dial settings, the system determines whether the transmission password conforms to the limit mode in the same group of real passwords, thereby determining whether the transaction is carried out.

According to the usage scenarios of financial cards in this embodiment, currently used financial cards are considered to be divided into magnetic cards and chip cards. The chip cards use ISO7816 contact interfaces and most of them have the NFC function. They can be used for transactions by swallowing cards in ATMs and can be used for transactions by NFC non-contact mode in most ATMs. Since the card swallowing method has restrictions on the thickness of the card, that is, the card needs to be relatively thin, it is difficult to manufacture the toggle device under this thickness requirement, and the toggle feel is slightly poor during adjustment, making it difficult to implement. In addition to the use of ATMs, most transaction card readers use semi-plug-in card reading, and this embodiment is easier to implement.

As shown in FIG. 20, when the current financial chip card is used, the power supply mode is used in this embodiment. The card is plugged into the financial card, and uses an NFC active mode to carry out data interaction by card reader. The toggle assembly settings are reported, including passwords and amounts, and transaction results are received. Optionally, transaction contents and amounts are displayed on the display screen of this card. This card is used as a semi-wrapped financial card, and can be shielded by magnetic isolation materials to reduce the leakage range of wireless signals. At the same time, the chip financial card has high security, and it is difficult to copy the financial card to use even if it has a password.

As shown in FIG. 21, the wireless energy collection module power supply mode is used in this embodiment. For the financial chip card with a wired communication interface, when it is used in half-plug contact, the card is inserted into the financial card, and the password setting mode is transferred to the financial card through the wired communication interface. The financial card then passes the password setting mode to the contact type card reader through the ISO7816 contact interface to quickly complete the security verification. When using NFC for financial chip cards, since NFC can read multiple cards overlappingly, the set password is passed to the card reader through NFC data interaction to quickly complete security verification.

Embodiment 2

A card with a toggle adjusting device includes a housing 100, a toggle adjusting component 200, a circuit board 301, a microprocessor 303, a data communication unit, a power supply device, an adjustable electrical signal component 311, and a data storage 308.

The toggle adjusting component 200 and the adjustable electrical signal component 311 constitute a toggle adjusting assembly; the electrical signal component converts different position states of the corresponding toggle adjusting components after toggling into different electrical signals; the adjustable electrical signal component is connected to the microprocessor through wires on the circuit board, and the microprocessor obtains set data.

A data communication unit is connected to the microprocessor through the wires on the circuit board to exchange data.

The data storage is connected to the microprocessor.

The power supply device is connected to the microprocessor.

The housing 100 is composed of a front packaging shell 101 and a back packaging shell 501, showing a thin sheet structure.

As shown in FIGS. 2-4, 6, 7, 8, 16-21, the adjustable electrical signal element 306 is a variable resistor. The toggle adjusting unit 201 is a gear toggle dial, and the adjustable electrical signal element 306 is a potentiometer integrated with the circuit board 301. The potentiometer is composed of an output end, the contact brush and a resistor body. The contact brush is a metal spring leaf 203 with an inner ring contact 204 and outer ring contacts 205. The metal spring leaf 203 is embedded into and fixedly connected to the lower surface of the gear toggle dial. The resistor body includes an outer ring carbon film body 208 with an opening on the circuit board 301. An inner ring metal circle 206 is arranged in the outer ring carbon film body 208. The inner ring metal circle 206 on the circuit board 301 is coaxial with the gear toggle dial and connected to the gear toggle dial through the rivets 202. The gear toggle dial and the circuit board are capable of rotating relative to each other. The metal spring leaf 203 conducts the outer ring carbon film body 208 with the inner ring metal circle 206. Different voltages distributed on the outer ring carbon film body 208 correspond to different marks on the scale on the upper surface of the gear toggle dial respectively when energized. One annular end of the opening of the outer ring carbon film body 208 is connected to the positive electrode of the power supply device, and the other end of the opening of the outer ring carbon film body is connected to the negative electrode of the power supply device. The metal spring leaf 203 conducts the different voltages distributed on the outer ring carbon film body 208 to the inner ring metal circle 206. The microprocessor 303 obtains different voltages of the outer ring carbon film body 208 through the metal spring leaf according to a mark on the rotation position of the gear toggle dial. The inner ring metal circle 206 is connected to the microprocessor 203. The microprocessor performs an AD conversion to obtain a value of the gear toggle dial rotation mark.

Other relevant components are the same as those in the Embodiment 1.

The housing 100 is composed of a front packaging shell 101 and a back packaging shell 501, showing a thin sheet structure.

As shown in FIGS. 3, 9, 10, and 18, the adjustable electrical signal element 306 is a variable capacitor. The toggle adjusting unit 201 is a gear toggle dial, and the adjustable electrical signal element 306, as shown in FIGS. 3, 9, 10, and 18, is a variable capacitor integrated with the circuit board 301. The variable capacitor comprises a stator 221, a rotor 220, and a rotor electrode 223. The stator 221 is located on a metal circuit layer on the back of the circuit board 301 and connected to the microprocessor 303 through an operational amplifier circuit. A periphery of the stator 221 is composed of a semicircle and an s-curve. The rotor 220 is a semicircular metal piece embedded into and fixedly connected to a bottom of the gear toggle dial. The rotor 220 and the stator 221 have semicircular homocentric diameters. The rotor electrode 223 is a notched circular metal piece concentric with the gear toggle dial. The rotor electrode 223 covers and presses the gear toggle dial. The rotor electrode 223 is fixedly welded to a front of the circuit board 301 through pins 227 evenly distributed around the rotor electrode. The rotor electrode 223 is connected to the negative electrode of the power supply device. A notch of the rotor electrode 223 shows part of the marks of the gear toggle dial and facilitates toggling the gear toggle dial. The gear toggle dial is placed on a front surface of the circuit board 301 to rotate and cooperate with the rotor electrode 223. The bottom of the rotor electrode 223 is conductive with the rotor 220 through the metal contact body 226. As the gear toggle dial rotates, the rotor 220 and the stator 221 and an insulating material of the circuit board 301 spaced between the rotor and the stator forms a capacitor. A projection of the rotor 220 on the circuit board changes from overlapping a semicircle of the stator 221 to forming a complete circle and then overlapping again. The stator 221 outputs different capacitance value signals to send to the microprocessor 303 after the different capacitance value signals are amplified by the operational amplifier circuit.

Other relevant components are the same as those in the Embodiment 1.

The rotor electrode 223 has the function of defining the movement of the gear toggle dial instead of the rivets 202 in the Embodiment 1.

Embodiment 3

A card with a toggle adjusting device includes a housing 100, a toggle adjusting component 200, a circuit board 301, a microprocessor 303, a data communication unit, a power supply device, an adjustable electrical signal component 311, and a data storage 308.

The toggle adjusting component 200 and the adjustable electrical signal component 311 constitute a toggle adjusting assembly; the electrical signal component converts different position states of the corresponding toggle adjusting components after toggling into different electrical signals; the adjustable electrical signal component is connected to the microprocessor through wires on the circuit board, and the microprocessor obtains set data.

A data communication unit is connected to the microprocessor through the wires on the circuit board to exchange data.

The data storage is connected to the microprocessor.

The power supply device is connected to the microprocessor.

Embodiment 4

A card with a toggle adjusting device includes a housing 100, a toggle adjusting component 200, a circuit board 301, a microprocessor 303, a data communication unit, a power supply device, an adjustable electrical signal component 311, and a data storage 308.

The toggle adjusting component 200 and the adjustable electrical signal component 311 constitute a toggle adjusting assembly; the electrical signal component converts different position states of the corresponding toggle adjusting components after toggling into different electrical signals; the adjustable electrical signal component is connected to the microprocessor through wires on the circuit board, and the microprocessor obtains set data.

A data communication unit is connected to the microprocessor through the wires on the circuit board to exchange data.

The data storage is connected to the microprocessor.

The power supply device is connected to the microprocessor.

The housing 100 is composed of a front packaging shell 101 and a back packaging shell 501, showing a thin sheet structure.

As shown in FIGS. 3, 11-14, and 18, the adjustable electrical signal element 306 is a multi-speed switch or a variable resistor. The toggle adjusting unit 201 is the toggle button, and the adjustable electrical signal element 306 is the multi-speed switch or a sliding variable resistor integrated with the circuit board 301. The toggle button slides and cooperates with a sliding groove 216 on the circuit board 301. The metal spring leaf 215 with first and second contacts is connected to the toggle button through screws. The first contact of the metal spring leaf 215 is in contact with a long strip metal line 210 on the upper surface of the circuit board 301. The long strip metal line 210 is connected to the microprocessor 303. The second contact of the metal spring leaf 215 is connected to the long strip multi-section metal lines 211 on the upper surface of the circuit board 301, respectively. Or, the second contact of the metal spring leaf 215 is in contact with the long strip carbon film body 212 on the upper surface of the circuit board 301. The long strip multi-section metal lines 211 form a linear series resistance circuit with the resistor R, respectively. One end of the circuit is connected to the positive electrode of the power supply device, and the other end of the circuit is connected to the negative electrode of the power supply device. The one end of the long strip carbon film body 212 is connected to the positive electrode of the power supply device, and the other end of the long strip carbon film body 212 is connected to the negative electrode of the power supply device. The different distributed voltages produced by the long strip carbon film body 212 when energized correspond to the marks next to the sliding groove 216. The microprocessor 303 obtains a corresponding voltage on the long strip carbon film body 212 from the long strip metal line 210 through the metal spring leaf 215 according to the toggle button and a position of the mark. According to this embodiment, a non-contact change signal is implemented, which will not cause wear and tear on the circuit board.

Embodiment 5

A card with a toggle adjusting device includes a housing 100, a toggle adjusting component 200, a circuit board 301, a microprocessor 303, a data communication unit, a power supply device, an adjustable electrical signal component 311, and a data storage 308.

The toggle adjusting component 200 and the adjustable electrical signal component 311 constitute a toggle adjusting assembly; the electrical signal component converts different position states of the corresponding toggle adjusting components after toggling into different electrical signals; the adjustable electrical signal component is connected to the microprocessor through wires on the circuit board, and the microprocessor obtains set data.

A data communication unit is connected to the microprocessor through the wires on the circuit board to exchange data.

The data storage is connected to the microprocessor.

The power supply device is connected to the microprocessor.

The housing 100 is composed of a front packaging shell 101 and a back packaging shell 501, showing a thin sheet structure.

Figure 18:
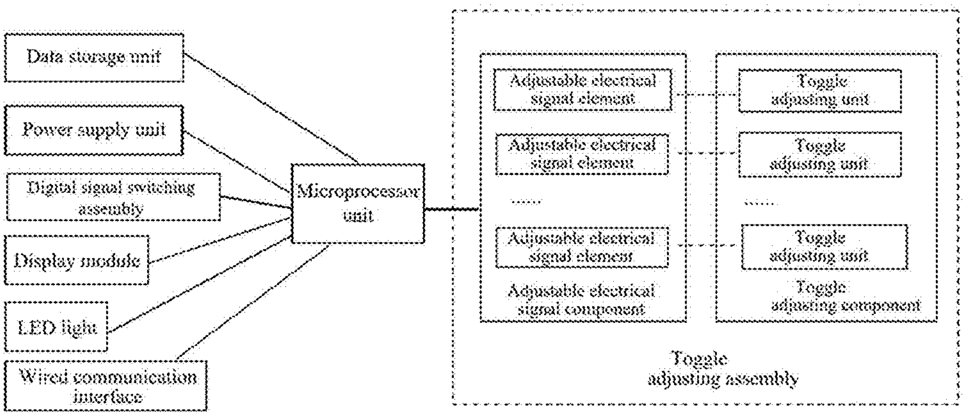
FIG. 18 is a schematic diagram of a circuit connection including a display module according to the Embodiments of the present disclosure.

As shown in FIGS. 3 and 18, the adjustable electrical signal element 306 is a magnetic angle sensor directly welded on the circuit board 301. The toggle adjusting unit 201 is a gear toggle dial, with a magnet embedded under the gear toggle dial and a rotor electrode 223, same as that in the Embodiment 3, arranged outside the gear toggle dial. One metal piece restricts the gear toggle dial to rotate only within this area. The rotation of the gear toggle dial drives the magnet to rotate, generating an angularly changing magnetic field. The magnetic angle sensor in this embodiment uses the KMT32B chip.

Other relevant components are the same as those in the Embodiment 1.

According to this embodiment, a non-contact change signal is implemented, which does not cause wear and tear on the circuit board. However, the cost is higher.

The invention claimed is:

1. A card with a toggle adjusting device, comprising a housing, a toggle adjusting component, a circuit board, a microprocessor, a data communication unit, a power supply device, an adjustable electrical signal component, and a data storage, wherein:

the toggle adjusting component and the adjustable electrical signal component constitute a toggle adjusting assembly; the adjustable electrical signal component converts different position states of the corresponding toggle adjusting components after toggling into different electrical signals;

the adjustable electrical signal component is connected to the microprocessor through wires on the circuit board, and the microprocessor obtains set data;

the data communication unit is connected to the microprocessor through the wires on the circuit board to exchange data;

the data storage is connected to the microprocessor;

the power supply device is connected to the microprocessor; and the housing comprises a front packaging shell and a back packaging shell, showing a thin sheet structure, wherein the toggle adjusting component comprises a plurality of toggle adjusting units, and the toggle adjusting unit is a toggle dial or a toggle button on a surface of the housing; the adjustable electrical signal component comprises a plurality of adjustable electrical signal elements; the data communication unit comprises at least one of NFC, Bluetooth, ISO7816 interface data and RFID, ZigBee and WIFI exchange methods, and wherein the data communication unit is connected to the microprocessor to exchange data externally, and the adjustable electrical signal element is a multi-speed switch or an adjustable resistor or an adjustable capacitor or an adjustable inductor or a magnetic angle sensor.

2. The card with a toggle adjusting device according to claim 1, wherein the toggle adjusting unit is a gear toggle dial, and the adjustable electrical signal element is the multi-speed switch integrated with the circuit board; the multi-speed switch comprises a common contact, a contact brush, and a plurality of contacts; the contact brush is a metal spring leaf with an inner ring contact and outer ring contacts; the metal spring leaf is embedded into and fixedly connected to a lower surface of the gear toggle dial; a plurality of contacts are outer ring multi-section metal circuits on the circuit board, and an inner ring metal circuit is the common contact; the inner and outer ring metal circuits on the circuit board are coaxial with the gear toggle dial and connected to the gear toggle dial through rivets; the gear toggle dial and the circuit board are capable of rotating relative to each other; the metal spring leaf conducts one section of the outer ring multi-section metal circuits with the inner ring metal circuit; the outer ring multi-section metal circuits correspond to different marks on a scale on an upper surface of the gear toggle dial, respectively; each metal circuit is connected to a voltage dividing resistor R at a different position, and the voltage dividing resistors R are connected to form a linear series circuit; one end of the linear series circuit is connected to a positive electrode of the power supply device, and the other end of the linear series circuit is connected to a negative electrode of the power supply device; each voltage dividing resistor generates a different voltage when the linear series circuit is energized; the inner ring contact is in contact with the inner ring metal circuit and connected to the microprocessor; and the microprocessor obtains different voltages of the outer ring multi-section metal circuits through the outer ring contacts according to a rotation position of the toggle adjusting unit.

3. The card with a toggle adjusting device according to claim 1, wherein the toggle adjusting unit is a gear toggle dial, and the adjustable electrical signal element is a potentiometer integrated with the circuit board; the potentiometer comprises an output end, the contact brush, and a resistor body; the contact brush is a metal spring leaf with an inner ring contact and outer ring contacts; the metal spring leaf is embedded into and fixedly connected to the lower surface of the gear toggle dial; the resistor body comprises an outer ring carbon film body with an opening on the circuit board; an inner ring metal circle is arranged in the outer ring carbon film body; the inner ring metal circle on the circuit board is coaxial with the gear toggle dial and connected to the gear toggle dial through the rivets; the gear toggle dial and the circuit board are capable of rotating relative to each other; the metal spring leaf conducts the outer ring carbon film body with the inner ring metal circle; different voltages distributed on the outer ring carbon film body correspond to different marks on the scale on the upper surface of the gear toggle dial respectively when energized; one annular end of the opening of the outer ring carbon film body is connected to the positive electrode of the power supply device, and the other end of the opening of the outer ring carbon film body is connected to the negative electrode of the power supply device; the metal spring leaf conducts the different voltages distributed on the outer ring carbon film body to the inner ring metal circle; the microprocessor obtains different voltages of the outer ring carbon film body through the metal spring leaf according to a mark on the rotation position of the gear toggle dial; the inner ring metal circle is connected to the microprocessor; and the microprocessor performs an AD conversion to obtain a value of the gear toggle dial rotation mark.

4. The card with a toggle adjusting device according to claim 1, wherein the toggle adjusting unit is a gear toggle dial, and the adjustable electrical signal element is a variable capacitor integrated with the circuit board; the variable capacitor comprises a stator, a rotor, and a rotor electrode; the stator is located on a metal circuit layer on the back of the circuit board and connected to the microprocessor through an operational amplifier circuit; a periphery of the stator comprises a semicircle and an s-curve; the rotor is a semicircular metal piece embedded into and fixedly connected to a bottom of the gear toggle dial; the rotor and the stator have semicircular homocentric diameters; the rotor electrode is a notched circular metal piece concentric with the gear toggle dial; the rotor electrode covers and presses the gear toggle dial; the rotor electrode is fixedly welded to a front of the circuit board through pins evenly distributed around the rotor electrode; the rotor electrode is connected to the negative electrode of the power supply device; a notch of the rotor electrode shows part of the marks of the gear toggle dial and facilitates toggling the gear toggle dial; the gear toggle dial is placed on a front surface of the circuit board to rotate and cooperate with the rotor electrode; the bottom of the rotor electrode is conductive with the rotor through the metal contact body; as the gear toggle dial rotates, the rotor and the stator and an insulating material of the circuit board spaced between the rotor and the stator forms a capacitor; a projection of the rotor on the circuit board changes from overlapping a semicircle of the stator to forming a complete circle and then overlapping again; and the stator outputs different capacitance value signals to send to the microprocessor after the different capacitance value signals are amplified by the operational amplifier circuit.

5. The card with a toggle adjusting device according to claim 1, wherein the toggle adjusting unit is the toggle button, and the adjustable electrical signal element is the multi-speed switch or a sliding variable resistor integrated with the circuit board; the toggle button slides and cooperates with a sliding groove on the circuit board; the metal spring leaf with a first and second contacts is connected to the toggle button through screws; the first contact of the metal spring leaf is in contact with a long strip metal line on the upper surface of the circuit board; the long strip metal line is connected to the microprocessor; the second contact of the metal spring leaf is connected to the long strip multi-section metal lines on the upper surface of the circuit board, respectively; or the second contact of the metal spring leaf is in contact with the long strip carbon film body on the upper surface of the circuit board; the long strip multi-section metal lines form a linear series resistance circuit with the resistor R, respectively; one end of the circuit is connected to the positive electrode of the power supply device, and the other end of the circuit is connected to the negative electrode of the power supply device; the one end of the long strip carbon film body is connected to the positive electrode of the power supply device, and the other end of the long strip carbon film body is connected to the negative electrode of the power supply device; the different distributed voltages produced by the long strip carbon film body when energized correspond to the marks next to the sliding groove; and the microprocessor obtains a corresponding voltage on the long strip carbon film body from the long strip metal line through the metal spring leaf according to the toggle button and a position of the mark.

6. The card with a toggle adjusting device according to claim 1, wherein the toggle adjusting assembly is connected to the microprocessor through a wire connection or a socket connection.

7. The card with a toggle adjusting device according to claim 6, wherein the socket connection enables the toggle adjusting assembly to be placed separately when not in use.

8. The card with a toggle adjusting device according to claim 1, wherein the power supply device supplies power by at least one of a wireless energy collection module and a power supply; the wireless energy collection module is capable of generating a current to the supply power when it is close to the wireless transmitting device; the power supply device has no power when the toggle adjusting assembly is configured to set the data; when the card is used, the card is close to the wireless transmitting device, and the power supply device generates electricity by induction; at this time, the settings of the toggle adjusting assembly are converted into electrical signals to input into the microprocessor; and the power supply device is connected to the microprocessor through a wire connection or a socket connection.

9. The card with a toggle adjusting device according to claim 1, further comprising a wired communication interface, the wired communication interface being connected to the microprocessor, wherein the wired communication interface is configured to connect to an external device for communication and power sharing.

10. The card with a toggle adjusting device according to claim 1, further comprising a display module, the display module being connected to the microprocessor and the housing having a display window corresponding to the display module, wherein the display module is configured to display settings and usage information.

11. The card with a toggle adjusting device according to claim 10, wherein the display module comprises a display screen and an electronic component other than the microprocessor that supports the driving of the display screen, and wherein the display screen is an e-paper display.

12. The card with a toggle adjusting device according to claim 1, further comprising an LED light, the LED light being connected to the microprocessor, wherein the LED light is configured to display working status and information indication.

13. The card with a toggle adjusting device according to claim 1, wherein the marks of the toggle adjusting component are numbers or Braille.

* * * * *